(12) United States Patent
Walker et al.

(10) Patent No.: US 10,604,347 B2
(45) Date of Patent: Mar. 31, 2020

(54) DRIVE SHAFT AND SPROCKETS FOR CHAIN CONVEYOR

(71) Applicant: Joy MM Delaware, Inc., Wilmington, DE (US)

(72) Inventors: Aaron Philip Walker, Evans City, PA (US); Christopher George Stewart, Oil City, PA (US)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 15/913,850

(22) Filed: Mar. 6, 2018

(65) Prior Publication Data

US 2018/0251316 A1 Sep. 6, 2018

Related U.S. Application Data

(60) Provisional application No. 62/467,761, filed on Mar. 6, 2017, provisional application No. 62/467,766, filed
(Continued)

(51) Int. Cl.
*B65G 19/20* (2006.01)
*B65G 17/40* (2006.01)
(Continued)

(52) U.S. Cl.
CPC ............. *B65G 19/20* (2013.01); *B65G 17/06* (2013.01); *B65G 17/26* (2013.01); *B65G 17/40* (2013.01); *B65G 17/44* (2013.01); *B65G 19/08* (2013.01); *B65G 19/18* (2013.01); *B65G 19/205* (2013.01); *B65G 19/24* (2013.01); *B65G 21/12* (2013.01); *B65G 21/2045* (2013.01);
(Continued)

(58) Field of Classification Search
CPC ........ B65G 23/06; B65G 23/04; B65G 23/02; B65G 23/00; F16H 55/30
USPC .................. 198/834; 474/152, 155, 156, 157
See application file for complete search history.

(56) References Cited

U.S. PATENT DOCUMENTS

| | | |
|---|---|---|
| 231,186 A | 8/1880 | Neacy |
| 572,991 A | 12/1896 | Howard |

(Continued)

FOREIGN PATENT DOCUMENTS

| | | |
|---|---|---|
| CN | 1044627 | 8/1990 |
| CN | 2211981 | 11/1995 |

(Continued)

OTHER PUBLICATIONS

Bureau of Mines United States Department of the Interior, "Noise Study of Longwall Mining Systems", Jan. 1986, Contract JO188072, Wyole Laboratories, cover page, p. 3, pp. 131-137 (9 pages).
(Continued)

*Primary Examiner* — William R Harp
(74) *Attorney, Agent, or Firm* — Michael Best & Friedrich LLP

(57) ABSTRACT

A drive mechanism for a chain conveyor includes an elongated shaft that extends along an axis and is configured to be driven to rotate by a motor. A sprocket is integrally formed with the shaft. The sprocket includes a plurality of lobes that extend around a perimeter of the shaft. Each lobe is spaced apart from an adjacent lobe by a recessed portion. Each of the recessed portions is configured to receive a drive pin of the chain conveyor.

17 Claims, 10 Drawing Sheets

Related U.S. Application Data on Mar. 6, 2017, provisional application No. 62/467,767, filed on Mar. 6, 2017, provisional application No. 62/467,769, filed on Mar. 6, 2017, provisional application No. 62/467,770, filed on Mar. 6, 2017, provisional application No. 62/467,773, filed on Mar. 6, 2017.

(51) Int. Cl.
| | | |
|---|---|---|
| *B65G 21/20* | (2006.01) | |
| *B65G 17/06* | (2006.01) | |
| *B65G 19/18* | (2006.01) | |
| *B65G 19/24* | (2006.01) | |
| *B65G 17/44* | (2006.01) | |
| *E21C 35/20* | (2006.01) | |
| *E21F 13/06* | (2006.01) | |
| *B65G 19/08* | (2006.01) | |
| *B65G 23/06* | (2006.01) | |
| *B65G 17/26* | (2006.01) | |
| *B65G 21/12* | (2006.01) | |
| *E21C 25/34* | (2006.01) | |
| *E21C 31/06* | (2006.01) | |
| *B65G 23/08* | (2006.01) | |
| *B65G 23/22* | (2006.01) | |
| *B65G 17/38* | (2006.01) | |
| *B65G 19/26* | (2006.01) | |
| *B65G 19/22* | (2006.01) | |
| *E21C 31/12* | (2006.01) | |

(52) U.S. Cl.
CPC ............ *B65G 23/06* (2013.01); *B65G 23/08* (2013.01); *B65G 23/22* (2013.01); *E21C 25/34* (2013.01); *E21C 31/06* (2013.01); *E21C 35/20* (2013.01); *E21F 13/066* (2013.01); *B65G 17/38* (2013.01); *B65G 19/22* (2013.01); *B65G 19/26* (2013.01); *B65G 2201/045* (2013.01); *B65G 2207/48* (2013.01); *B65G 2812/0295* (2013.01); *B65G 2812/0297* (2013.01); *E21C 31/12* (2013.01)

(56) References Cited

U.S. PATENT DOCUMENTS

| | | | |
|---|---|---|---|
| 708,924 A | 9/1902 | Scott et al. | |
| 1,008,890 A | 11/1911 | Demarest | |
| 1,020,863 A | 3/1912 | Weichseldorfer | |
| 1,153,375 A | 9/1915 | Elliott | |
| 1,427,229 A | 8/1922 | Robbins et al. | |
| 1,699,334 A | 1/1929 | Petersen | |
| 1,869,050 A | 7/1932 | Coppage | |
| 2,222,025 A * | 11/1940 | Fischer | B65G 17/08 198/834 |
| 2,386,619 A * | 10/1945 | Long | B65G 23/00 198/728 |
| 2,450,501 A | 10/1948 | Clarkson | |
| 2,674,365 A | 4/1954 | Russell | |
| 2,754,957 A | 7/1956 | Dodson | |
| 2,761,548 A | 9/1956 | Long | |
| 2,784,836 A | 3/1957 | Tourneau | |
| 3,005,356 A * | 10/1961 | Gandrud | F16D 1/0864 403/344 |
| 3,103,275 A | 9/1963 | Rollins | |
| 3,119,276 A | 1/1964 | Pearson | |
| 3,145,576 A | 8/1964 | Proctor | |
| 3,225,897 A | 12/1965 | Rollins | |
| 3,324,990 A | 6/1967 | Karlovsky, Jr. | |
| 3,452,228 A | 6/1969 | Woolley | |
| 3,472,563 A * | 10/1969 | Irgens | B62D 55/244 305/112 |
| 3,540,566 A | 11/1970 | Perry et al. | |
| 3,602,364 A | 8/1971 | Maglio et al. | |
| 4,037,713 A * | 7/1977 | Soliman | B65G 23/06 198/725 |
| 4,175,797 A | 11/1979 | Krekeler | |
| 4,202,219 A | 5/1980 | Weis | |
| 4,218,932 A | 8/1980 | McComber | |
| 4,238,028 A | 12/1980 | Lake | |
| 4,461,372 A | 7/1984 | Bekkala et al. | |
| 4,585,117 A | 4/1986 | Hahn | |
| 4,766,995 A | 8/1988 | Sterwerf, Jr. | |
| 4,844,314 A | 4/1989 | Wilson, III | |
| 4,899,868 A | 2/1990 | Johnson | |
| 4,917,658 A | 4/1990 | Sugimoto et al. | |
| 4,964,344 A | 10/1990 | Robinson | |
| 5,000,310 A | 3/1991 | Edmondson | |
| 5,056,651 A | 10/1991 | Nagamatsu | |
| 5,088,594 A | 2/1992 | Edmondson | |
| 5,096,048 A | 3/1992 | Lachner et al. | |
| 5,156,256 A | 10/1992 | David | |
| 5,165,766 A | 11/1992 | Thomas | |
| 5,177,949 A * | 1/1993 | Stadele | D01H 9/187 198/834 |
| 5,186,526 A | 2/1993 | Pennington | |
| 5,213,199 A | 5/1993 | Braun et al. | |
| 5,226,526 A | 7/1993 | O'Brien | |
| 5,305,872 A | 4/1994 | Hutton | |
| 5,628,393 A | 5/1997 | Steeber | |
| 5,669,680 A * | 9/1997 | Bertoni | B62D 55/092 305/119 |
| 5,762,424 A | 6/1998 | Harris et al. | |
| 6,375,589 B1 * | 4/2002 | Makino | F16H 7/06 474/148 |
| 6,640,534 B1 | 11/2003 | Harnaes et al. | |
| 6,662,932 B1 | 12/2003 | O'Neill | |
| 7,036,657 B1 | 5/2006 | Robinson | |
| 7,118,648 B2 | 10/2006 | Dever et al. | |
| 7,422,256 B2 | 9/2008 | Mueller | |
| 7,438,180 B1 | 10/2008 | Taylor et al. | |
| 7,442,139 B2 * | 10/2008 | Kubo | B65G 23/06 474/152 |
| 7,997,402 B2 | 8/2011 | Merten et al. | |
| 8,016,102 B2 | 9/2011 | Morris | |
| 8,038,558 B2 | 10/2011 | Klabisch et al. | |
| 8,141,696 B2 | 3/2012 | O'Neill | |
| 8,177,049 B2 | 5/2012 | O'Neill | |
| 8,360,912 B2 | 1/2013 | Klabisch et al. | |
| 8,448,781 B2 | 5/2013 | Morris | |
| 8,453,826 B2 | 6/2013 | Morris | |
| 8,672,110 B2 | 3/2014 | Jaeger | |
| 8,887,901 B2 * | 11/2014 | Cox | B65G 23/06 198/834 |
| 8,936,146 B2 | 1/2015 | Morris | |
| 8,950,571 B2 | 2/2015 | O'Neill | |
| 8,960,809 B2 * | 2/2015 | O'Neill | E21C 27/24 299/64 |
| 8,978,877 B2 | 3/2015 | O'Neill | |
| 9,227,787 B2 | 1/2016 | Morris et al. | |
| 9,284,124 B2 | 3/2016 | Klingbeil | |
| 9,415,939 B2 | 8/2016 | Arnold et al. | |
| 9,434,428 B2 | 9/2016 | Hakes et al. | |
| 9,487,358 B2 | 11/2016 | Morris et al. | |
| 10,106,325 B2 | 10/2018 | Walker et al. | |
| 10,150,617 B2 | 12/2018 | O'Neill | |
| 2002/0050442 A1 | 5/2002 | Malitzki | |
| 2002/0129732 A1 | 9/2002 | Marshall | |
| 2004/0140182 A1 | 7/2004 | Morris | |
| 2005/0176539 A1 | 8/2005 | Hirschmann | |
| 2005/0027459 A1 | 12/2005 | Kwiat | |
| 2005/0274590 A1 | 12/2005 | Kwiat | |
| 2006/0058144 A1 | 3/2006 | Lacerda | |
| 2006/0172841 A1 | 8/2006 | Nunez et al. | |
| 2007/0107412 A1 | 5/2007 | Humcke et al. | |
| 2008/0011588 A1 | 1/2008 | Frost et al. | |
| 2009/0218199 A1 | 9/2009 | Russell | |
| 2009/0250318 A1 | 10/2009 | O'Neill | |
| 2009/0277757 A1 | 11/2009 | Boudreau | |
| 2009/0318239 A1 | 12/2009 | Kampf | |
| 2010/0276254 A1 | 11/2010 | O'Neill | |
| 2011/0067793 A1 | 3/2011 | Nukushina | |

(56) References Cited

U.S. PATENT DOCUMENTS

| | | |
|---|---|---|
| 2011/0067980 A1 | 3/2011 | Martin |
| 2011/0088367 A1 | 4/2011 | Powell et al. |
| 2011/0315521 A1 | 12/2011 | O'Neill |
| 2012/0048684 A1 | 3/2012 | Morris |
| 2013/0203539 A1 | 8/2013 | Kirchner et al. |
| 2013/0227833 A1 | 9/2013 | Rizzo |
| 2013/0284569 A1 | 10/2013 | Studer |
| 2013/0334015 A1 | 12/2013 | Lasecki |
| 2014/0027247 A1 | 1/2014 | Cox et al. |
| 2014/0116850 A1 | 5/2014 | Musick et al. |
| 2014/0239699 A1 | 8/2014 | O'Neill |
| 2015/0008101 A1 | 1/2015 | Miglava |
| 2015/0101912 A1 | 4/2015 | Morris et al. |
| 2015/0191313 A1 | 7/2015 | Arnold et al. |
| 2015/0266527 A1 | 9/2015 | Akinlua et al. |
| 2015/0353152 A1 | 12/2015 | Hakes et al. |
| 2016/0159417 A1 | 6/2016 | Zimmer et al. |
| 2016/0200520 A1 | 7/2016 | Menke et al. |
| 2017/0137226 A1 | 5/2017 | Morris et al. |

FOREIGN PATENT DOCUMENTS

| | | |
|---|---|---|
| CN | 1517280 | 8/2004 |
| CN | 201087012 | 7/2008 |
| CN | 101602433 | 12/2009 |
| CN | 101875433 | 11/2010 |
| DE | 3151059 | 7/1983 |
| DE | 19633298 | 2/1998 |
| DE | 20300239 | 3/2003 |
| EP | 1197671 | 4/2002 |
| EP | 2147875 | 1/2010 |
| EP | 2221495 | 8/2010 |
| EP | 2436944 | 4/2012 |
| GB | 205440 | 10/1923 |
| GB | 658623 | 10/1951 |
| GB | 671424 | 5/1952 |
| GB | 2458768 | 10/2009 |
| JP | 05576263 | 8/2014 |
| RU | 2064393 | 7/1996 |
| SU | 963922 | 10/1982 |
| WO | WO9008716 | 8/1990 |
| WO | WO03013987 | 2/2003 |
| WO | WO2012054775 | 4/2012 |

OTHER PUBLICATIONS

Leikin A. E., Rodin B.1., "Adhesive Materials", Material Sciences. M., High School, 1971, p. 405, http://www.nglib.ru/book_view.jsp?idn=016470&page=405&format=free.

International Search Report with Written Opinion for Application No. PCT/US2018/21233 dated May 24, 2018 (16 pages).

* cited by examiner

DRIVE SHAFT AND SPROCKETS FOR CHAIN CONVEYOR

CROSS-REFERENCE TO RELATED APPLICATIONS

This application claims the benefit of prior-filed, U.S. Provisional Patent Application No. 62/467,761, filed Mar. 6, 2017; U.S. Provisional Patent Application No. 62/467,766, filed Mar. 6, 2017; U.S. Provisional Patent Application No. 62/467,767, filed Mar. 6, 2017; U.S. Provisional Patent Application No. 62/467,769, filed Mar. 6, 2017; U.S. Provisional Patent Application No. 62/467,770, filed Mar. 6, 2017; and U.S. Provisional Patent Application No. 62/467,773, filed Mar. 6, 2017. The entire contents of each of these documents are incorporated by reference herein.

BACKGROUND

The present disclosure relates to material conveyors, and particularly to chain and flight conveyors.

SUMMARY

Mining machines such as continuous miners and chain haulage units may include chain conveyors that are capable of deflecting laterally in order to travel through lateral turns. The chain conveyors may include flight members for pushing or urging material along a pan. The chain may be driven by one or more sprockets.

In one independent aspect, a drive mechanism for a chain conveyor includes an elongated shaft that extends along an axis and is configured to be driven to rotate by a motor. A sprocket is integrally formed with the shaft. The sprocket includes a plurality of lobes that extend around a perimeter of the shaft. Each lobe is spaced apart from an adjacent lobe by a recessed portion. Each of the recessed portions is configured to receive a drive pin of the chain conveyor.

In another independent aspect, a drive mechanism for a chain conveyor includes a drive shaft with a first end and a second end. The first end is configured to be driven by a motor output shaft. The first end includes one of a bore and a projection. The one of the bore and the projection define a polygonal-shaped profile having convex curvilinear sides. A sprocket is integrally formed with the shaft and is positioned between the first end and the second end. The sprocket is configured to engage and drive pins of a conveyor chain.

In yet another independent aspect, a conveyor system includes a chain conveyor and a drive system. The chain conveyor includes a plurality of links. At least some of the links have a first side portion and a second side portion. Each of the side portions includes an integrally formed drive pin protruding away from the other drive pin. The drive system includes an elongated shaft that extends along an axis and is configured to be driven to rotate by a motor. A first sprocket is integrally formed with the shaft. The sprocket includes a plurality of first lobes that extend around a perimeter of the shaft. Each first lobe is spaced apart from an adjacent first lobe by a first recessed portion. Each of the first recessed portions is configured to receive the drive pins of the first side portions. A second sprocket is integrally formed with the shaft and is offset from the first sprocket along the axis of the shaft. The sprocket includes a plurality of second lobes that extend around the perimeter of the shaft. Each second lobe is spaced apart from an adjacent second lobe by a second recessed portion. Each of the second recessed portions is configured to receive the drive pins of the second side portions.

In still another independent aspect, a conveyor system includes a chain conveyor and a drive system. The chain conveyor includes a plurality of links. At least some of the links have a first side portion and a second side portion. Each of the side portions includes an integrally formed drive pin protruding away from the other drive pin. The drive system includes a drive shaft with a first end and a second end. The first end is configured to be driven by a motor output shaft. The first end includes one of a bore and a projection. The one of the bore and the projection defines a polygonal-shaped profile with convex curvilinear sides. A first sprocket is integrally formed with the shaft. The sprocket includes a plurality of first lobes that extend around a perimeter of the shaft. Each first lobe is spaced apart from an adjacent first lobe by a first recessed portion. Each of the first recessed portions is configured to receive the drive pins of the first side portions. A second sprocket is integrally formed with the shaft and is offset from the first sprocket along the axis of the shaft. The sprocket includes a plurality of second lobes that extend around the perimeter of the shaft. Each second lobe is spaced apart from an adjacent second lobe by a second recessed portion. Each of the second recessed portions is configured to receive the drive pins of the second side portions.

Other aspects will become apparent by consideration of the detailed description and accompanying drawings.

Figure 1:
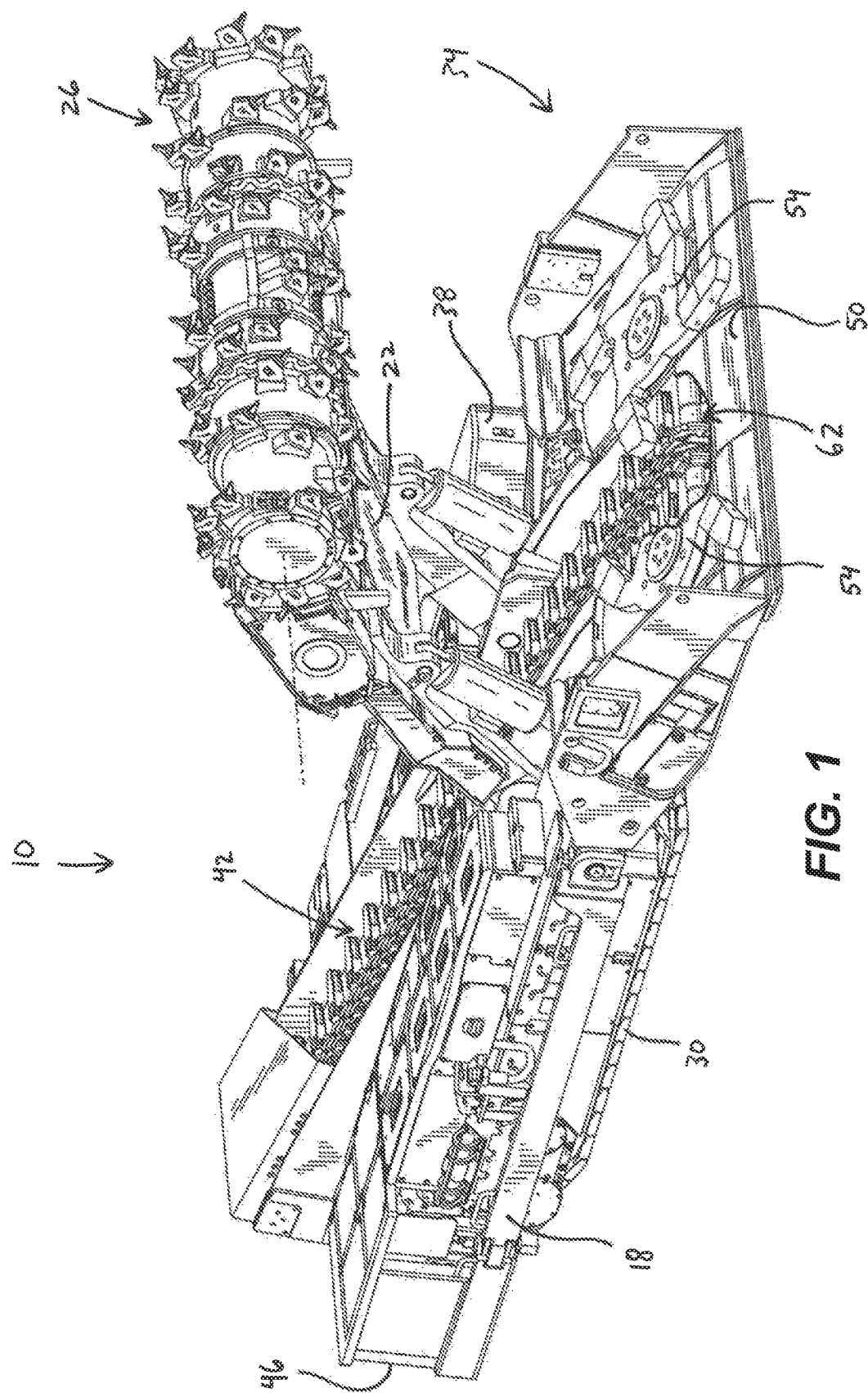
FIG. 1 is a perspective view of a mining machine.

Before any independent embodiments of the disclosure is explained in detail, it is to be understood that the disclosure is not limited in its application to the details of the construction and the arrangements of components set forth in the following description or illustrated in the drawings. The disclosure is capable of other independent embodiments and of being practiced or being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or fluid connections or couplings, whether direct or indirect. Also, electronic communications and notifications may be performed using any known means including direct connections, wireless connections, etc.

DETAILED DESCRIPTION

FIG. 1 illustrates a mining machine 10, such as a continuous mining machine. In the illustrated embodiment, the mining machine 10 includes a frame or chassis 18, a boom 22 pivotably coupled to the chassis 18, and a cutter head 26 supported on the boom 22. The chassis 18 may be supported for movement relative to a support surface (not shown) by a traction mechanism (e.g., crawlers 30).

Figure 2:
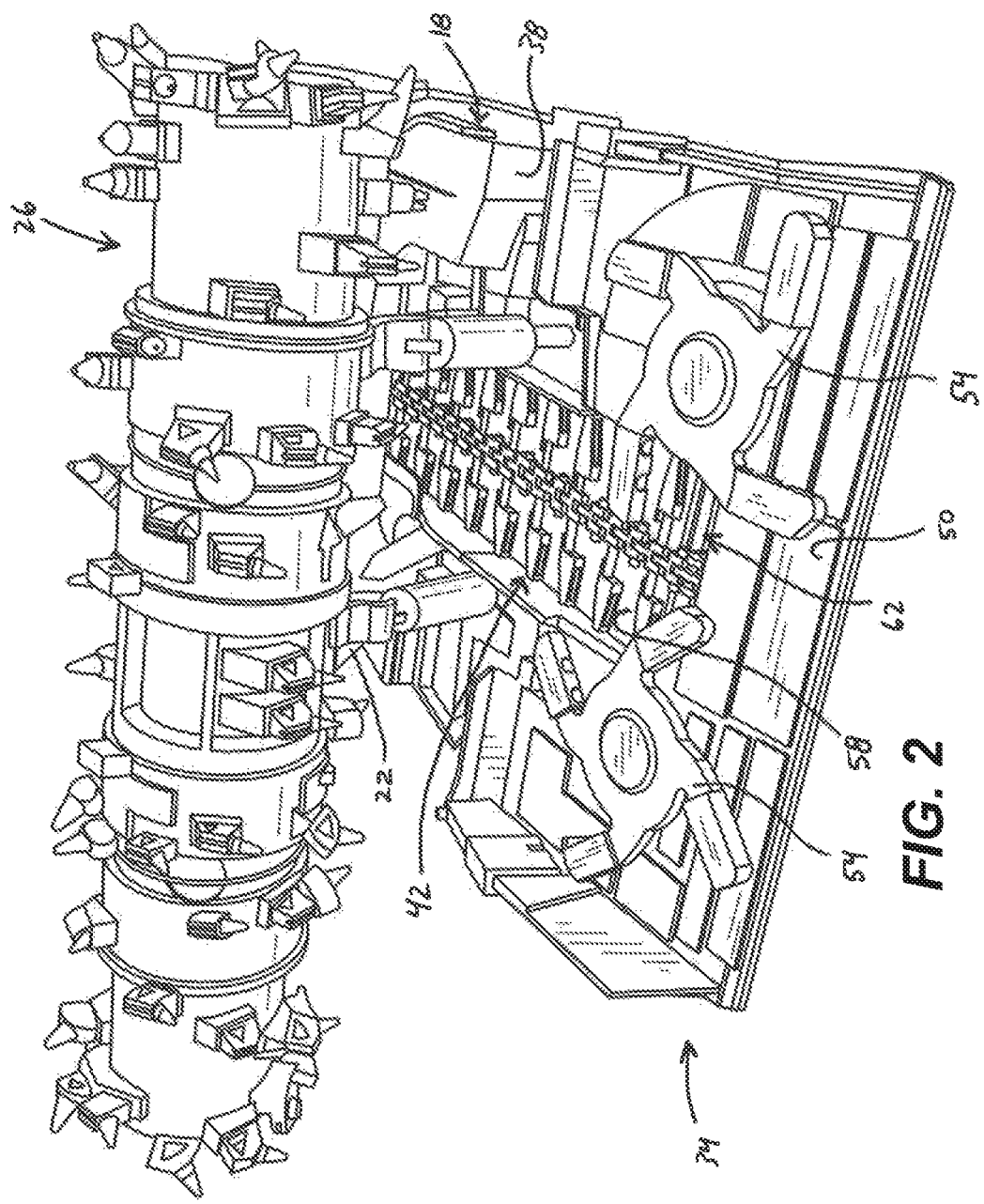
FIG. 2 is a perspective view of a forward end of the mining machine of FIG. 1.

As shown in FIGS. 1 and 2, a collecting mechanism or gathering head 34 is positioned adjacent a first end or forward end 38 of the chassis 18, and a conveyor 42 extends in a continuous loop from the forward end 38 of the chassis 18 toward a second or rear end 46 of the chassis 18. The gathering head 34 is positioned below the cutter head 26 and includes a deck 50 and a pair of rotating arms 54 that engage and direct dislodged material onto the conveyor 42. The conveyor 42 transports the cut material from the forward end 38 toward the rear end 46 (FIG. 1) of the chassis 18, from the area below the cutter head 26 to another conveyor or a haulage machine (not shown) positioned proximate the rear end 46 of the chassis 18.

Figure 3:
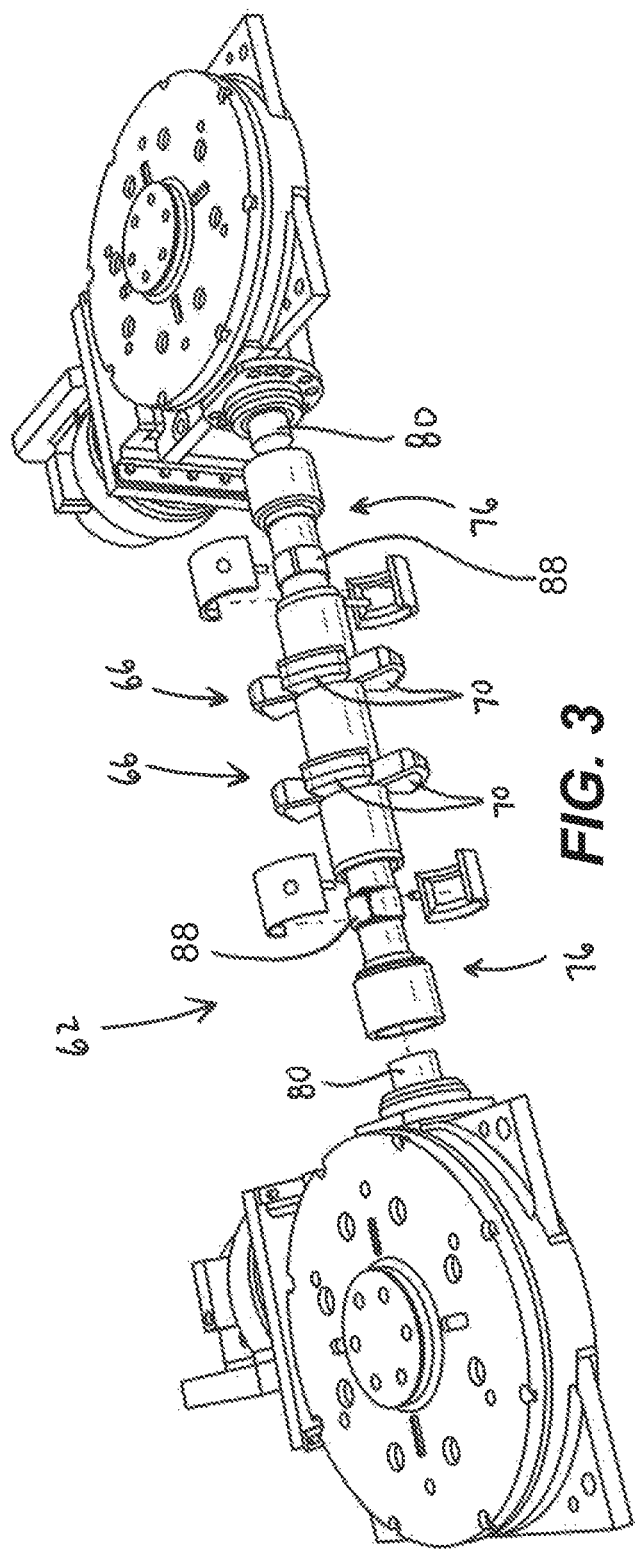
FIG. 3 is an exploded view of a conveyor drive assembly.

As shown in FIG. 2, the conveyor 42 is a chain conveyor formed by chain link connected sequentially in a continuous loop. The conveyor 42 drives cut material along a chain pan or deck 58. The conveyor 42 is driven by a drive assembly including a shaft 62 positioned adjacent the gathering head 34 of the chassis 18. As shown in FIG. 3, the shaft 62 is oriented laterally relative to the chassis 18 (FIG. 2) and is driven (e.g., by one or more motors) to rotate relative to the chassis 18. Sprockets 66 engage and move the conveyor 42 and are secured to the shaft 62.

Figure 4:
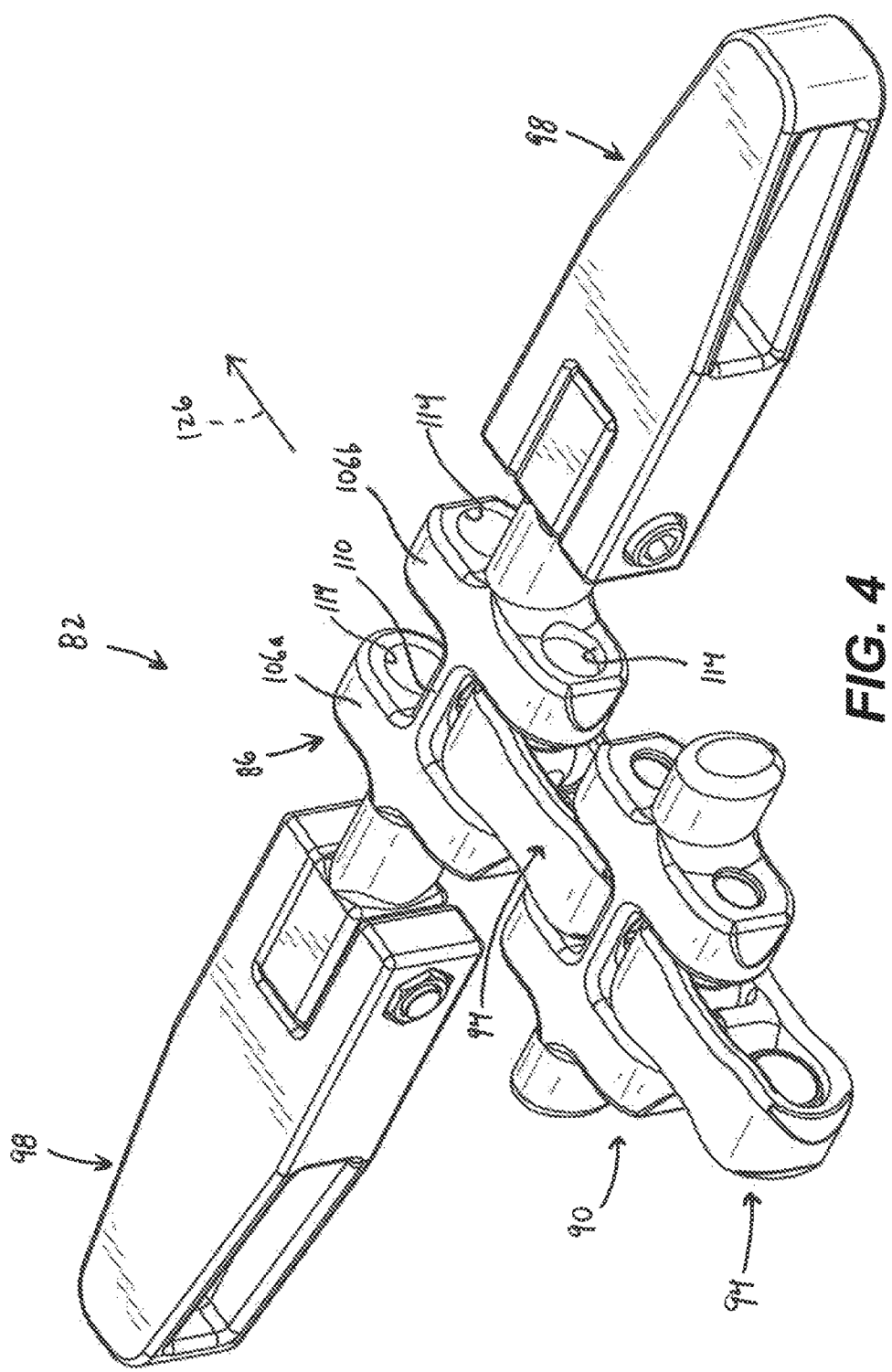
FIG. 4 is a perspective view of a chain conveyor unit.
Figure 5:
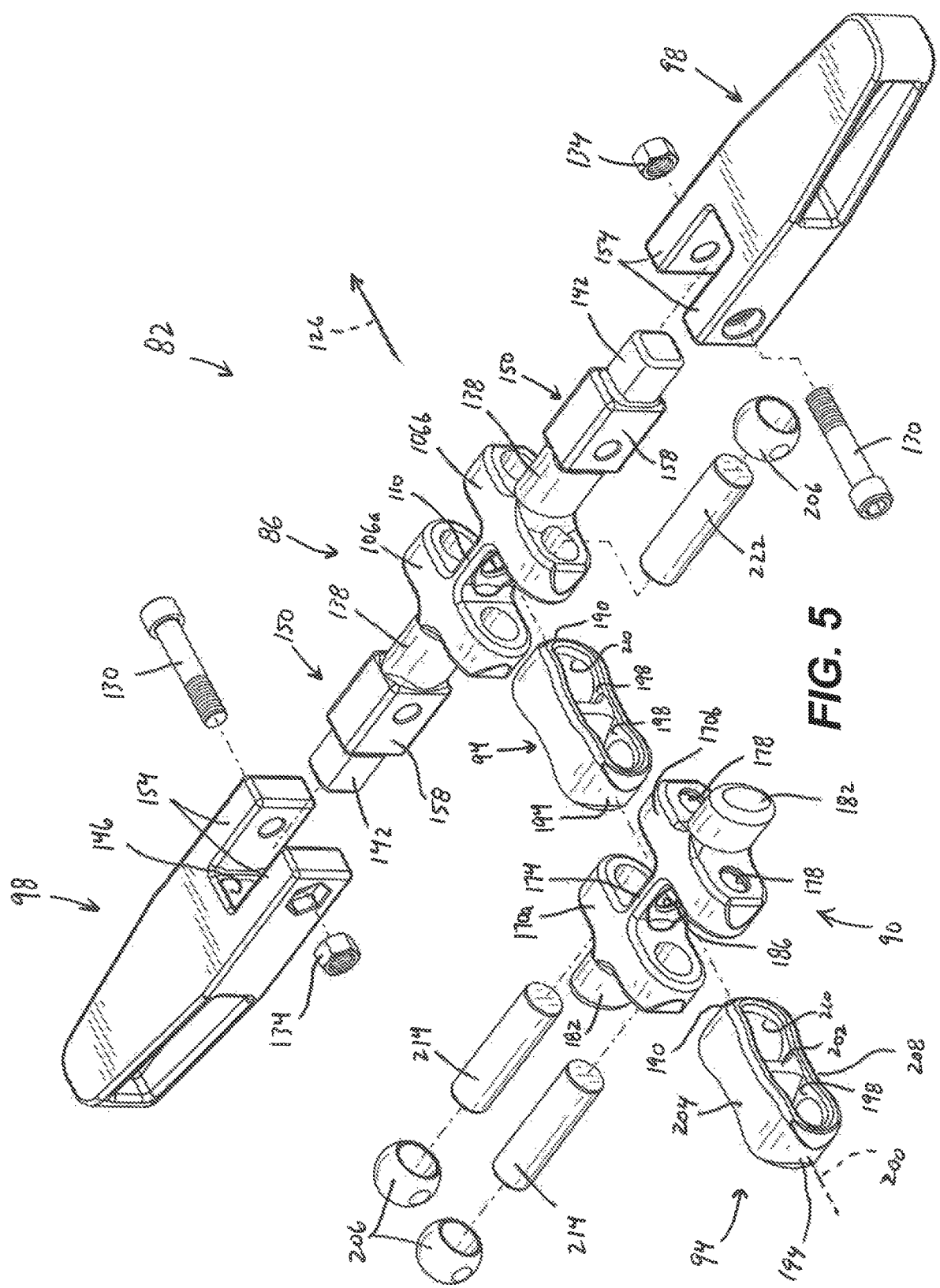
FIG. 5 is an exploded view of the chain conveyor unit of FIG. 4.

FIGS. 4 and 5 show a unit of the chain 82 that forms the conveyor 42. In the illustrated embodiment, the chain 82 includes a first link or flight link 86, a second link or connecting link 90, a coupler link or swivel link 94 coupling the flight link 86 to the connecting link 90, and flights or flight bars 98 positioned laterally outward from the flight link 86. Another swivel link 94 may couple the connecting link 90 to another flight link (not shown), and the conveyor chain 82 may therefore include a sequence of alternating flight links and connecting links, each joined to one another by swivel links. In other embodiments, the chain 82 may include a different sequence of links—for example, multiple connecting links may be positioned between one flight link and the subsequent flight link. Various permutations of the links are possible.

In the illustrated embodiment, the flight link 86 includes a pair of lugs or side portions 106 (a first side portion 106a and a second side portion 106b) and a bridge 110 extending between inner surfaces of the side portions 106. Each side portion 106 includes a pair of apertures 114 extending through the inner surface and an outer surface of each side portion 106.

As best shown in FIG. 5, the flight link 86 further includes a pair of flight pins 122, and each flight pin 122 extends outwardly from the outer surface of one of the side portions 106. In the illustrated embodiment, the flight pins 122 are aligned with one another (i.e., along a common axis), and each of the flight pins 122 is positioned between the chain pins 222 (described in further detail below). Stated another way, the flight pins 122 extend laterally or transversely relative to a direction of travel 126 of the conveyor 42. Each of the flight pins 122 is positioned between the apertures 114 of the associated side portion 106. In the illustrated embodiment, the flight bar 98 is coupled to one of the flight pins 122 (e.g., by a threaded bolt 130 and nut 134). A sprocket-engaging portion or drive portion 138 of each flight pin 122 is positioned between the side portion 106 and the associated flight bar 98. In the illustrated embodiment, an end portion 142 of each flight pin 122 is positioned within an opening 146 of one of the flight bars 98.

As shown in FIG. 5, each connecting link 90 includes a pair of lugs or side portions 170 (a first side portion 170a and a second side portion 170b) and a bridge 174 extending between inner surfaces of the side portions 170. Each side portion 170 includes a pair of apertures 178 extending through the inner surface and an outer surface of each side portion 170. In addition, a drive pin 182 extends outwardly from an outer surface of each side portion 170. Stated another way, each drive pin 182 extends laterally or transversely relative to the direction of travel 126 of the chain 82. Each drive pin 182 is positioned between the apertures 178 of the associated side portion 170. The sprockets 66 (FIG. 3) engage the drive pins 182 and the drive portions 138 of the flight pins 122 to drive the chain 82. In the illustrated embodiment, the bridge 174 of the connecting link 90 includes an opening 186.

Referring again to FIG. 5, the swivel link 94 includes a first end 190, a second end 194, and a pair of openings 198 extending laterally from one side of the swivel link 94 to another opposite side of the swivel link 94. A swivel link longitudinal axis 200 extends between the first end 190 and the second end 194. Under nominal operating conditions, the swivel link longitudinal axis 200 is aligned with the direction of travel 126 of the chain 82. In the illustrated embodiment, the swivel link 94 is formed as a vertical open chain link in which the openings 198 are separated by a gusset or reinforcement member 202. Each swivel link 94 further includes a pair of support members or bearings, such as spherical bearings 206. Each bearing 206 is positioned in a pocket 210 (FIG. 5) formed in an associated one of the openings 198 of the swivel link 94.

One of the openings 198 is aligned with parallel apertures 178 in the side portions 170 of the connecting link 90, while the other opening 198 is aligned with parallel apertures 114 in the side portions 106 of the flight link 86. A first connecting pin or first chain pin 214 is inserted through the apertures 178 of the connecting link side portions 170 and through one opening 198 of the swivel link 94, thereby coupling the swivel link 94 to the connecting link 90. Similarly, a second connecting pin or second chain pin 222 is inserted through the apertures 114 of the flight link side portions 106 and through the other opening 198 of the swivel link 94, thereby coupling the swivel link 94 to the flight link 86. Each of the chain pins 214, 222 is supported for pivoting movement relative to the swivel link 94 by one of the bearings 206 positioned in the connected swivel link 94.

In the illustrated embodiment, the first chain pin 214 is inserted through the connecting link side portions 170 in a first lateral direction, while the second chain pin 222 is inserted through the flight link side portions 106 in a second lateral direction opposite the first lateral direction. The chains pins 214, 222 are secured against movement relative to the connecting link 90 and flight link 86 by retainers (e.g., self-locking retaining rings—not shown). Also, in some embodiments, one side of one of the side portions 170 may include an aperture 178b having a reduced diameter such that each pin 214 can only be inserted from one side of the connecting link 90 to the other. The flight pin apertures 114 may be structured in a similar manner.

Figure 6:
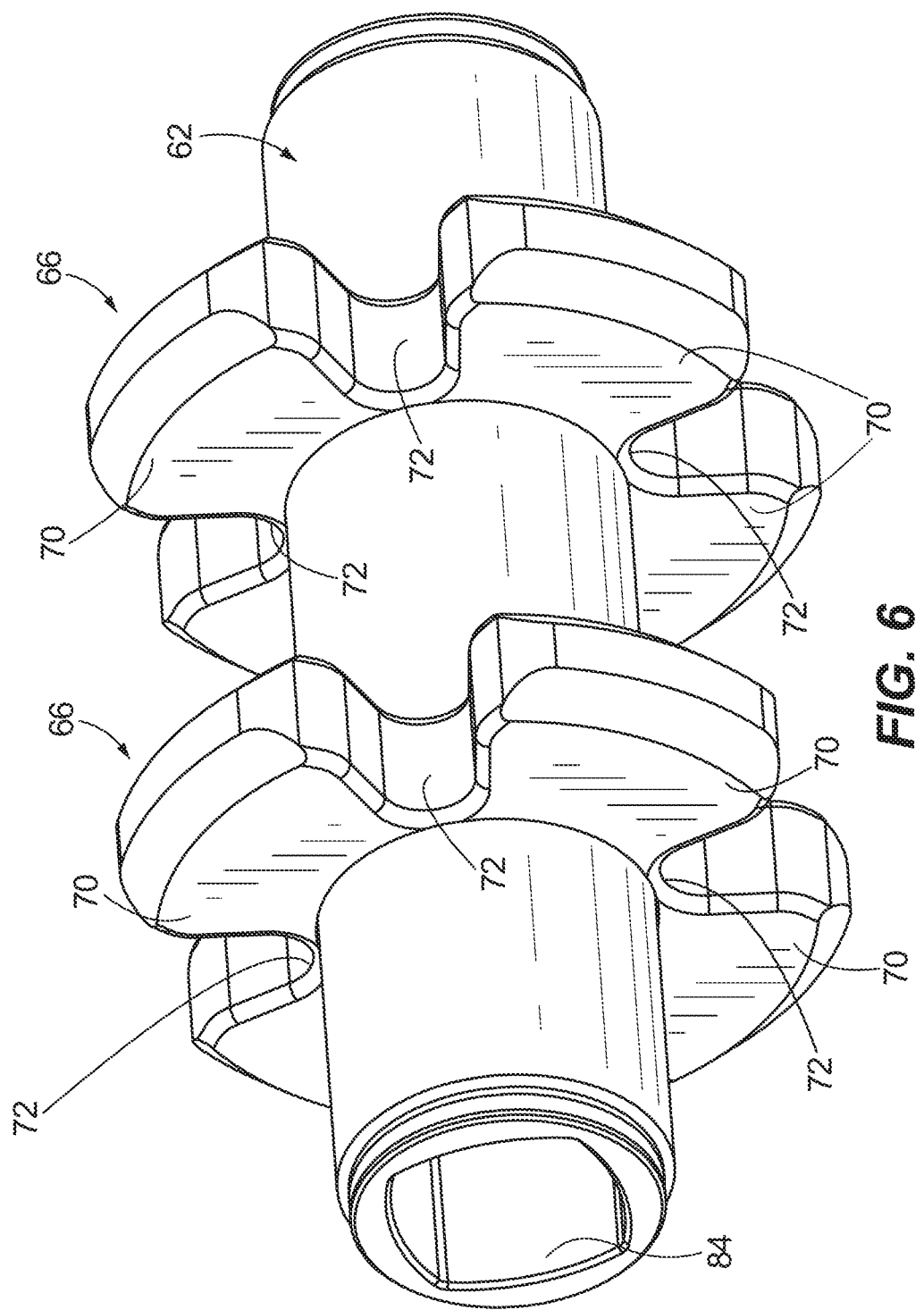
FIG. 6 is a perspective view of a drive shaft and sprockets.
Figure 7:
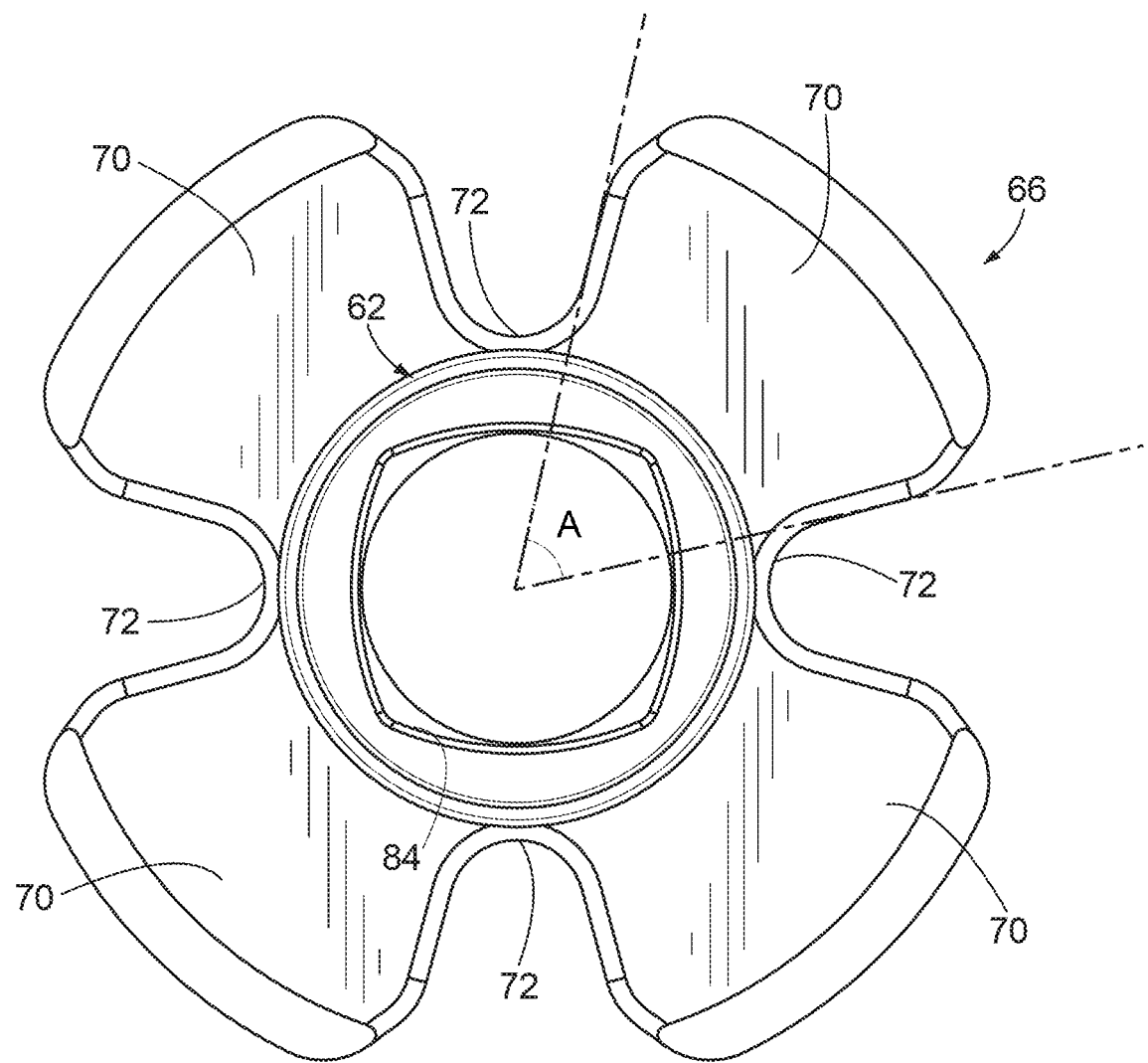
FIG. 7 is an end view of the drive shaft and sprockets of FIG. 6.

FIGS. 6 and 7 illustrate the shaft 62 and the sprockets 66 secured to the shaft 62. In the illustrated embodiment, each sprocket 66 includes four teeth or lobes 70 spaced apart about perimeter of the shaft 62 by equal angular intervals (e.g., 90 degrees about the shaft 62); in other embodiments, each sprocket 66 may include fewer or more lobes positioned in a different manner about the shaft. In some embodiments, each lobe 70 subtends an angle A about the axis of the shaft 62. In some embodiments, the angle A is at least 30 degrees. In some embodiments, the angle A is at least 40 degrees. In some embodiments, the angle A is at least 50 degrees. In some embodiments, the angle A is at least 60 degrees. In some embodiments, the angle A is at least 65 degrees. In other embodiments, each lobe 70 may subtend an angle equal to or greater than 65 degrees about the axis of the shaft 62. Recesses 72 are positioned between the lobes 70. In particular, the recesses 72 receive the drive pins 182 (FIG. 5) and the drive portions 138 of the flight pins 122, and rotation of the sprockets 66 causes the lobes 70 to drive the chain 82. In the illustrated embodiment, the recesses 72 are substantially parabolic in shape.

In the illustrated embodiment, the shaft 62 and sprockets 66 are cast as a unitary member. As a result, the shaft 62 and sprockets 66 may be cast in a near net shape, avoiding the need for additional assembly and fabrication (e.g., welding) and avoiding the variability and inconsistencies associated with those processes. In addition, the material used for the cast parts is through hardened, providing improved wear characteristics. In some embodiments, the shaft 62 and sprockets 66 may be formed from austempered ductile iron.

Figure 8:
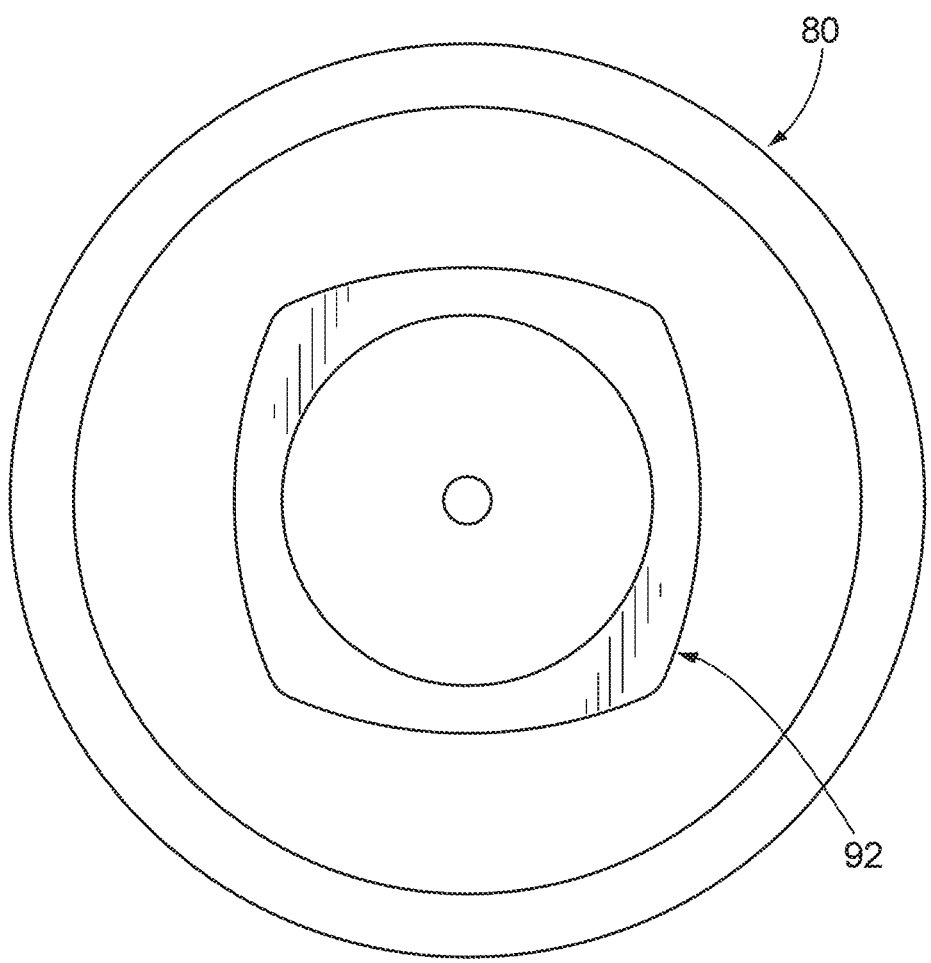
FIG. 8 is an end view of a motor output shaft.

Referring again to FIG. 3, each end of the shaft 62 is driven by an end 88 of a coupler shaft 76, which is in turn coupled to a motor output shaft 80. As shown in FIGS. 6 and 7, each end of the shaft 62 includes a recess or bore 84 for receiving a corresponding end 88 of the coupler shaft 76. In the illustrated embodiment, the bore 84 has four sides to form a spline having a nearly-polygonal profile, although each side is curved or beveled such that the sides are non-linear (e.g., convex curvilinear sides). In other embodiments, the bore 84 could be formed with three sides, or more than four sides. The end 88 of the coupler shaft 76 may have a similar profile. Similarly, as shown in FIG. 8, the end of the motor output shaft 80 may also include a similar nearly-polygonal spline 92. The polygonal profile of the drive shaft components provide lower stresses in the bores 84 compared to conventional shaft splines due to the lack of sharp stress concentrations, and may reduce cracking in the spline surfaces. In other embodiments (not shown), the motor output shaft 80 may include a recess receiving an end of the coupler shaft 76 or the shaft 62.

Figure 9:
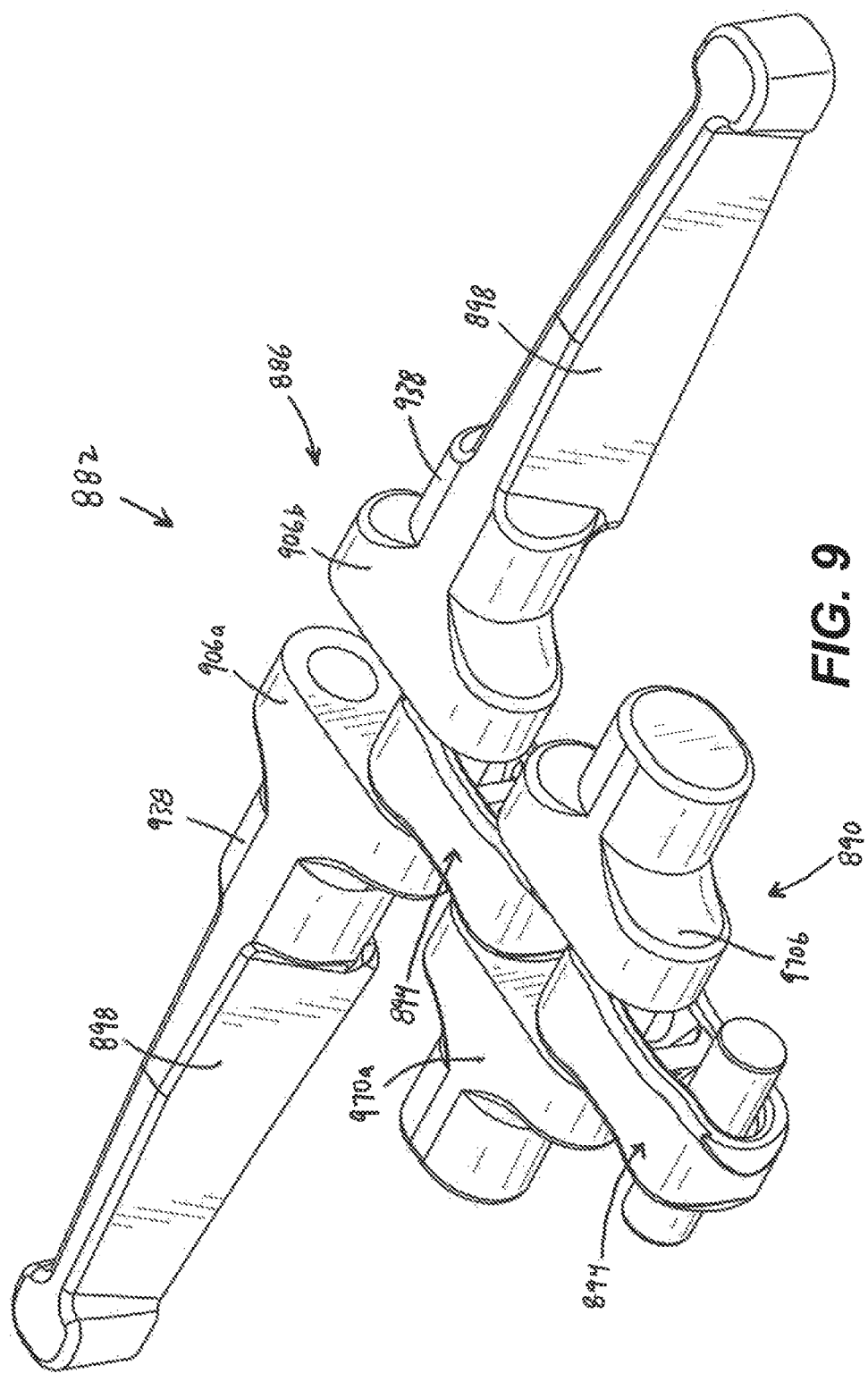
FIG. 9 is a perspective view of a chain conveyor unit according to another embodiment.
Figure 10:
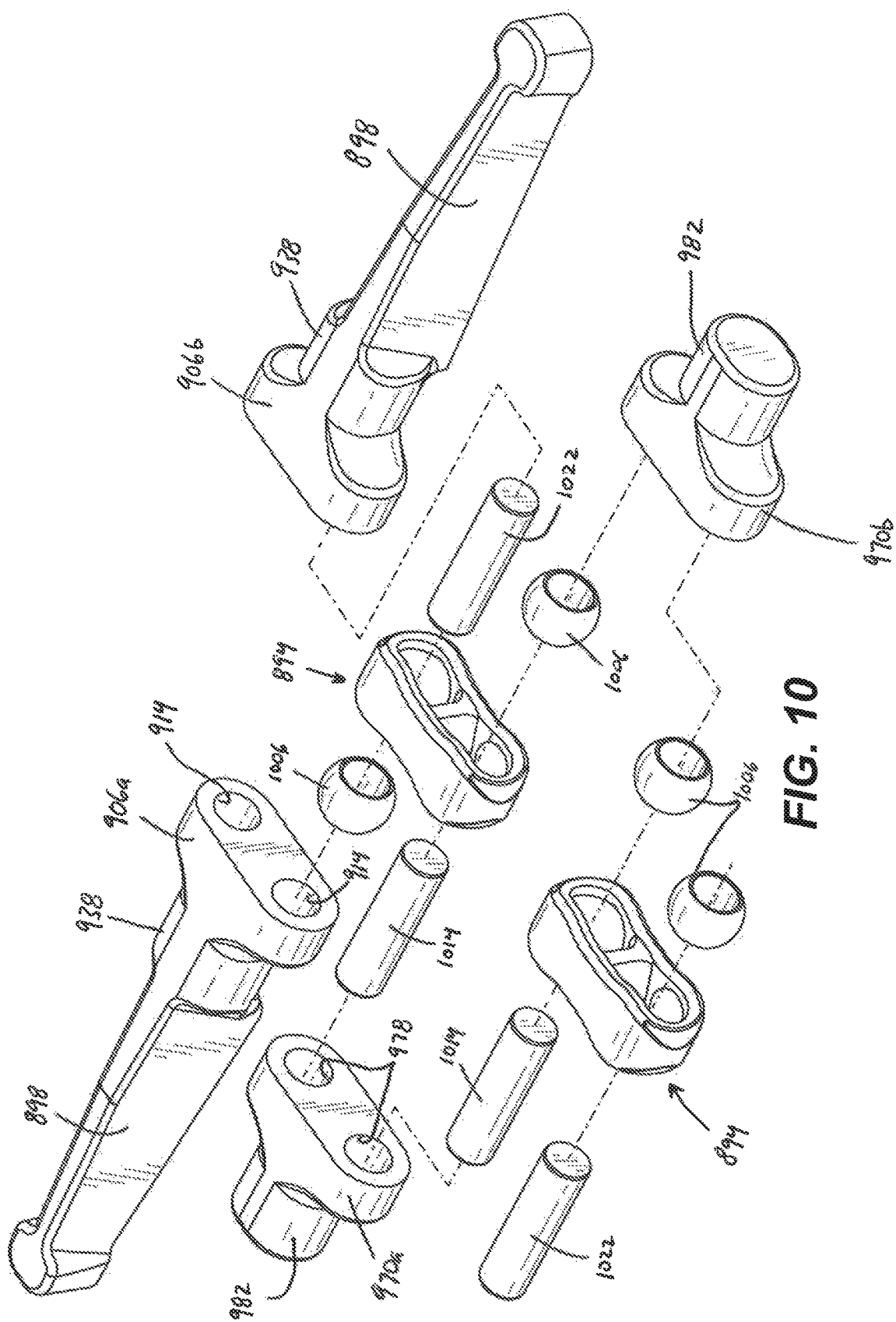
FIG. 10 is an exploded view of the chain conveyor unit of FIG. 9.

FIGS. 9 and 10 illustrate a chain 882 according to another embodiment. Features of the chain 882 are similar to features of the chain 82 and are identified with similar reference numbers, plus 800. For the sake of brevity, only differences between the chain 82 and 882 are described below. In addition, components or features described with respect to only one or some of the embodiments described herein are equally applicable to any other embodiments described herein.

The chain 882 includes a flight link 886 including a pair of side portions 906 that are separate from one another and not directly connected. Stated another way, the flight link 886 does not include a bridge between the side portions 906. Rather, the side portions 906 are coupled to one another by the connecting pins 1022 (FIG. 10) extending between the side portion 906 and through a swivel link 894. Similarly, a connecting link 890 includes a pair of side portions 970 that are separate from one another and not directly connected. Stated another way, the connecting link 886 does not include a bridge between the side portions 970, which are formed as separate components 970a, 970b. Rather, the side portions 970 are coupled to one another by the connecting pins 1014 (FIG. 10) extending between the side portion 970 and through the swivel link 894.

In addition, a flight 898 is formed integrally with each side portion 906 of the flight link 886. In the illustrated embodiment, a drive portion 938 protrudes from each side portion 906, and the flight 898 extends laterally outwardly from an end of the drive portion 938. The drive portion 938 is positioned between the side portion 906 and the flight 898. It is understood that aspects of the chain 882 may be incorporated into other disclosed embodiments. For example, an integral flight may be incorporated into the flight link 86 described above with respect to FIGS. 4 and 5.

Although the conveyor is described above with respect to a continuous mining machine, it is understood that the conveyor may be incorporated into other types of machines including but not limited to roadheaders and entry drivers, as well as loading and hauling machines including but not limited to shuttle cars, battery haulers, or other types.

Although aspects have been described in detail with reference to certain preferred embodiments, variations and modifications exist within the scope and spirit of one or more independent aspects as described.

What is claimed is:

1. A drive system for a chain conveyor, the drive system comprising:
   an elongated shaft extending along an axis and configured to be driven to rotate by a motor;
   a sprocket integrally formed with the shaft, the sprocket including a plurality of lobes, the lobes extending around a perimeter of the shaft and each lobe being spaced apart from an adjacent lobe by a recessed portion, each of the recessed portions configured to receive a drive pin of the chain conveyor, each of the lobes subtending an angle of at least twenty degrees about the axis, each lobe including a first portion positioned proximate the axis and a second portion positioned radially outward relative to the first portion, the second portion having a width substantially larger than a width of the first portion.

2. The drive system for a chain conveyor of claim 1, wherein the plurality of lobes includes four lobes equally spaced around the perimeter of the shaft.

3. The drive system for a chain conveyor of claim 1, wherein each of the lobes subtends an angle about the axis that is substantially larger than an angle subtended by one of the recessed portions.

4. The drive system for a chain conveyor of claim 1, wherein the shaft and sprocket are cast as a unitary piece from austempered ductile iron.

5. The drive system for a chain conveyor of claim 1, wherein an end of the shaft is configured to be coupled to an output shaft of the motor, the end of the shaft including a bore having a cross-section formed as a polygon having convex curvilinear sides.

6. The drive system for a chain conveyor of claim 1, wherein the recessed portions are substantially parabolic in shape.

7. The drive system for a chain conveyor of claim 1, wherein the sprocket is a first sprocket and the drive pin is a first drive pin, the drive system further comprising a second sprocket integrally formed with the shaft and offset from the first sprocket along the axis of the shaft, the second sprocket including a plurality of second lobes, the second lobes extending around the perimeter of the shaft and each second lobe being spaced apart from an adjacent second lobe by a second recessed portion, each of the second recessed portions configured to receive a second drive pin of the chain conveyor.

8. A drive system for a chain conveyor comprising:
a drive shaft including a first end and a second end, the first end configured to be driven by a motor output shaft, the first end including one of a bore and a projection, the one of the bore and the projection defining a polygonal-shaped profile having convex curvilinear sides;
a sprocket integrally formed with the drive shaft and positioned between the first end and the second end, the sprocket configured to engage and drive pins of a conveyor chain; and
a coupler shaft disposed between the output shaft and the first end of the drive shaft, the coupler shaft including one end including a bore and an opposite end including a projection, the bore configured to engage one of the motor output shaft and the first end of the drive shaft, the projection engaging the other of the motor output shaft and the first end of the drive shaft, each of the bore and the projection defining a polygonal-shaped profile having convex curvilinear sides.

9. The drive system for a chain conveyor of claim 8, wherein the drive shaft includes the bore and the motor output shaft includes the projection, wherein the bore profile and the projection cross-section are shaped as rectangles having convex curvilinear sides.

10. The drive system for a chain conveyor of claim 8, wherein the drive shaft and the sprocket are cast as a unitary piece from austempered ductile iron.

11. The drive system for a chain conveyor of claim 8, wherein the sprocket includes a plurality of lobes, the lobes extending around a perimeter of the drive shaft and each lobe being spaced apart from an adjacent lobe by a recessed portion, each of the recessed portions configured to receive a drive pin of the chain conveyor.

12. The drive system of a chain conveyor of claim 11, wherein the sprocket is a first sprocket and the drive pin is a first drive pin, the drive system further comprising a second sprocket integrally formed with the drive shaft and offset from the first sprocket along a longitudinal axis of the drive shaft, the second sprocket including a plurality of second lobes, the second lobes extending around a perimeter of the drive shaft and each second lobe being spaced apart from an adjacent second lobe by a second recessed portion, each of the second recessed portions configured to receive a second drive pin of the chain conveyor.

13. The drive system of a chain conveyor of claim 11, wherein the lobes are spaced apart from one another at equal angular intervals.

14. A conveyor system comprising:
a chain conveyor including a plurality of links, at least some of the links including a first side portion and a second side portion, each of the side portions including an integrally formed drive pin protruding away from the other drive pin; and
a drive system including,
an elongated shaft extending along an axis and configured to be driven to rotate by a motor, and
a first sprocket integrally formed with the shaft, the sprocket including a plurality of first lobes, the first lobes extending around a perimeter of the shaft and each first lobe being spaced apart from an adjacent first lobe by a first recessed portion, each of the first recessed portions configured to receive the drive pins of the first side portions, each of the plurality of first lobes extending fewer than seventy degrees around the perimeter of the drive shaft, each first lobe including a first portion positioned proximate the axis and a second portion positioned radially outward relative to the first portion, the second portion having a width substantially larger than a width of the first portion; and
a second sprocket integrally formed with the shaft and offset from the first sprocket along the axis of the shaft, the second sprocket including a plurality of second lobes, the second lobes extending around the perimeter of the shaft and each second lobe being spaced apart from an adjacent second lobe by a second recessed portion, each of the second recessed portions configured to receive the drive pins of the second side portion, each of the plurality of second lobes extending fewer than seventy degrees around the perimeter of the drive shaft, each second lobe including a first portion positioned proximate the axis and a second portion positioned radially outward relative to the first portion, the second portion having a width substantially larger than a width of the first portion.

15. The conveyor system of claim 14, wherein the at least some of the links include a bridge integrally formed between the first side portion and a second side portion.

16. The conveyor system of claim 14, wherein an end of the shaft is configured to be coupled to an output shaft of the motor, the end of the shaft including a bore having a cross-section formed as a polygon having convex curvilinear sides.

17. The conveyor system of claim 14, wherein at least one of the drive shaft and sprockets, the first side portions and integrally formed drive pins, or the second side portions and integrally formed drive pins, are cast as a unitary piece from austempered ductile iron.

* * * * *